J. GRESHAM.
Assignor to the NATHAN MANUFACTURING COMPANY.
INJECTOR.
No. 10,697. Reissued Mar. 9, 1886.
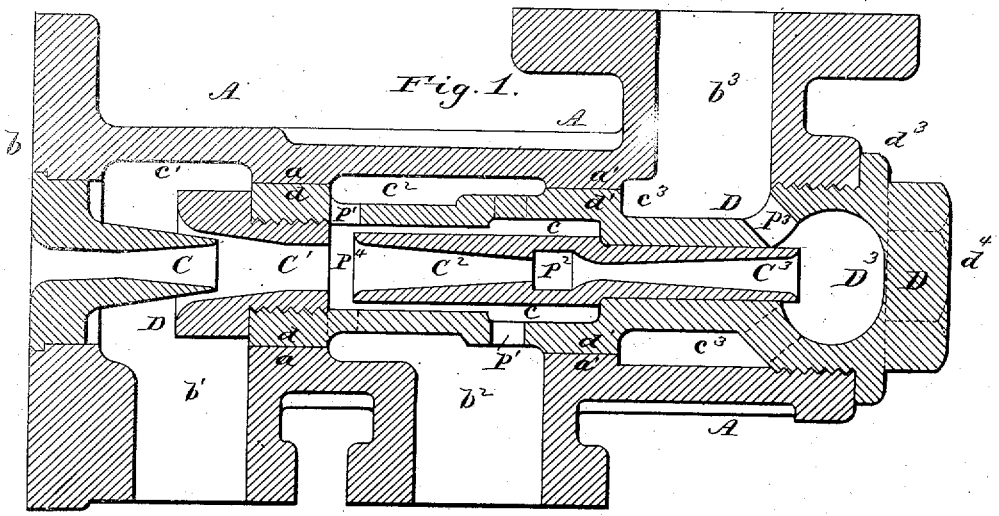
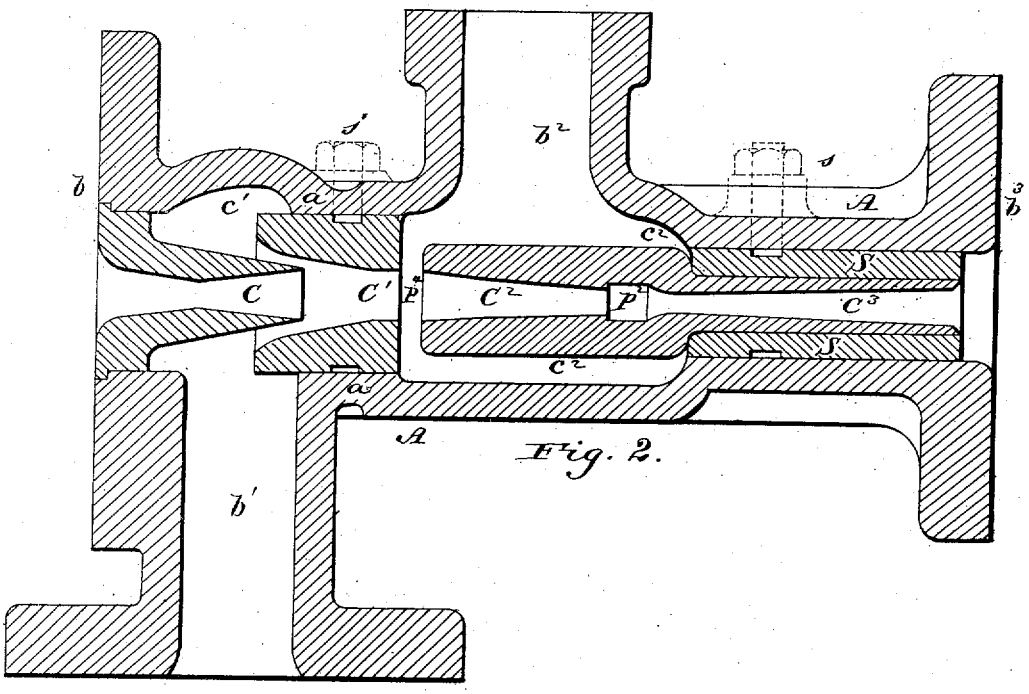
Witnesses:
H. N. Low
E. A. Dick
Inventor:
James Gresham
by Marcellus Bailey
his atty.

UNITED STATES PATENT OFFICE.

JAMES GRESHAM, OF MANCHESTER, ENGLAND, ASSIGNOR TO THE NATHAN MANUFACTURING COMPANY, OF NEW YORK, N. Y.

INJECTOR.

SPECIFICATION forming part of Reissued Letters Patent No. 10,697, dated March 9, 1886.

Original No. 318,892, dated May 26, 1885. Application for reissue filed February 10, 1886. Serial No. 191,523. Patented in England May 2, 1884, No. 7,116, and July 23, 1884, No. 10,475, and in France June 14, 1884, No. 162,753.

*To all whom it may concern:*

Be it known that I, JAMES GRESHAM, a subject of the Queen of England, residing at Manchester, in England, have invented certain new and useful Improvements in Injectors, (for which I have obtained Letters Patent in France, No. 162,753, dated June 14, 1884, and in England under dates May 2, 1884, No. 7,116, and July 23, 1884, No. 10,475,) of which the following is a full, clear, and exact description.

This invention has for its object certain improvements by means of which an injector is automatically started and kept at work after steam has been admitted thereto.

The further object of my invention is to so arrange the internal parts of the injector as to readily remove the same from their casing, with the exception of the steam-cone; and the invention has, lastly, for its object to so improve the parts of which the injector is constructed as to adapt the same to lift liquids from greater depths than is the case with injectors heretofore used.

The principles of construction involved in this invention are based upon and consist in improvements in the construction of what is known as the "Robinson and Gresham Injector," patented in England on the 10th day of November, 1864, No. 2,789, and the "Brooke and White Injector," patented in the same country on the 17th of September, 1883, No. 4,430.

In the Robinson and Gresham injector the combining and discharging cones are connected together, the diameter of the latter cone being made as small as this can possibly be done with regard to its axial passage, said cone being movable longitudinally within the injector-casing and adjusted by mechanical devices. In this construction the great velocity of the combined jet of steam and water as it leaves the discharging-cone effectually prevents any leakage between said cone and the bearings in which it slides, so that all packing is dispensed with, while any temporary leakage before the jet is fully established is drawn in by the passing current at the overflow-orifice.

In my present invention it is important that this arrangement of discharging-cone with its reduced exterior diameter, and fitted into the casing so as to adapt it to move longitudinally, should be retained for the reason that were the exterior of the cone made of large diameter the velocity of jet would not have the effect of practically preventing leakage, which is necessary for the good operation of the injector.

In the Brooke and White injector the combining and discharging cones are also made of one piece or connected together, and in Fig. 1 mechanical devices are shown to adjust the cones, while in Fig. 2 the adjustment of said cones relatively to the lifting-cone is effected mechanically by means of a spring in one direction only, and under the reactive pressure of the jet of water in a reverse direction against the tension of the spring. In these constructions the exterior diameter of the discharging-cone is comparatively great, and leakage cannot be prevented without incurring an amount of friction that will be a bar to the movements of the cone. Besides this, the jet, before it can move the discharging-cone against the tension of the spring in contact with the lifting-cone by reactive power, will have to attain great force.

This invention therefore consists, first, in the combination, with an injector-casing, a steam-cone, a lifting-cone, an overflow branch or chamber, and a communicating passage between said overflow-branch and lifting-cone, of a compound combining and discharging cone arranged for longitudinal motion within the casing, and to be automatically moved away from or toward the injector by the entering jet of steam, or the combined jet of water and steam, so as to open or close said communicating passage; second, in the combination, with the injector-casing, of the movable combining and discharging cones, and a lifting-cone arranged within said casing, in which said cones are arranged, said casing being detachably connected with the injector-case, whereby the parts may be removed without uncoupling the injector from its connections; third, in the combination, with an injector-casing and a steam and lifting cone, of a compound combining and discharging cone having an overflow-orifice interposed between their axial passages, the outer diameter of the discharging-cone being reduced as much as its axial passage will permit, and arranged to slide to and from the lifting-cone under the action of the jet of steam or steam and water, all as hereinafter described, and as shown in the accompanying drawings, in which—

Figures 1 and 2 are longitudinal sections of my improved injector, the latter showing a slight modification in the arrangement of the parts.

A indicates the injector-casing, which has, as usual, a steam inlet or branch, $b$, a water-branch, $b'$, an overflow-branch, $b^2$, and a discharging-branch, $b^3$. In its interior the casing A has bearing-surfaces $a$ $a'$, that serve as seats for like surfaces $d$ $d'$ of an interior casing, D, by which bearing-surfaces, the casings A D, and the lifting and steam cones are formed annular chambers $c'$ $c^2$ $c^3$, that communicate, respectively, with the water-branch $b'$, overflow-branch $b^2$, and discharge-branch $b^3$. In the steam portion or branch $b$ is seated the steam-cone C, and in the outer end of the casing D is secured the lifting-cone C′, into which the steam-cone projects. The casing D is screw-threaded at its rear end, to adapt it to be screwed into the end of the casing A, said casing D terminating in a flange, $d^3$, and a flat or bolt head, $d^4$, for the application of a wrench to screw the casing D to or unscrew it from the casing A.

Within the casing D are located the compound combining and discharging cones $C^2$ $C^3$, the body or diameter of the latter cone, $C^3$, being reduced as much as its axial passage will permit, said cone being fitted into a contracted portion of the axial opening of the casing D, so that it can slide freely therein. The two cones $C^2$ $C^3$ are preferably formed of one piece, overflow-ports $p^2$ being formed between them, leading into chamber $c$, formed by the combining-cone and the enlarged axial passage of casing D, which chamber is in communication with the chamber $c^2$, and through the latter with overflow-branch $b^2$ by ports or passages $p$, formed in the walls of the casing D.

In rear of the point of connection of the lifting-cone C′ with the casing D the latter has formed in its walls passages or ports $p'$, that also communicate with the chamber $c^2$, and through the latter with the overflow-branch $b^2$.

At its rear end the axial passage of the casing D terminates in an enlarged chamber, $D^3$, that communicates with the chamber $c^3$, and through the latter with the discharge-branch $b^3$ by ports or passages $p^3$.

The operation of the injector may be briefly described as follows: Assuming that the injector has been in operation and stopped, and that the combining-cone $C^2$ is in contact with the lifting-cone C′, closing or cutting off the communication between said cones and chamber $c$, and through the latter by ports $p'$ with chamber $c^2$ and overflow-branch $b^2$, as soon as the steam is turned on the pressure thereof exerted on the inner walls of the combining and discharging cones $C^2$ $C^3$ will cause the same to move rearwardly or away from the lifting-cone, thereby forming a passage, $p^4$, by which steam can escape to overflow-branch through $p'$ $c^2$. When a partial vacuum has been established, water will be lifted and carried by and with the steam over the space into and through the combining and discharging cones, and as soon as the jet is established its reactive pressure on the end of the discharging-cone will cause the same and the combining-cone to slide forward, bringing the latter cone in contact with the lifting-cone to close the passage $p^4$, when the injector will be fully at work. If any slight leakage should occur between the discharging-cone and its bearing in casing D, such leakage would at once be drawn in at the ports $p^2$ by the great velocity of the combined jet of steam and water, thus producing a perfect joint at the points named notwithstanding the mobility of the cone in its bearing. The combined jet of steam and water passes by ports $p^3$ into the discharge-branch and thence to the point of delivery—boiler or other vessel.

If from any cause it becomes necessary to gain access to the interior of the casing A, or to the steam-cone, or to the lifting and combining and discharging cones, this can be done without uncoupling the injector-casing from its various connections by simply unscrewing therefrom the interior casing, D, and removing it from casing A, as will be readily understood. In such cases, when the removal of the internal portions of the injector without uncoupling the same from its various connections is not of material importance, the construction may be greatly simplified, as shown in Fig. 2. In this case the discharge of the combined jet of steam and water is a direct one, it taking place on a plane coinciding with the axial passage of the cones.

Instead of a casing, D, a simple sleeve, S, is here employed, secured in position by a set-screw, $s$, that penetrates through casing A into an annular groove formed in the periphery of the sleeve, while the lifting-cone C′ is secured in a similar manner to its seat by a set-screw, $s'$. It will be observed that the communication between the passage $p^4$ and the overflow $p^2$ with the chamber $c^2$ and overflow-branch $b^2$ is a direct one instead of through the casing D, as above set forth. The operation, however, is precisely the same as that above set forth.

It will further be observed that the sleeve S may be dispensed with were it not for the danger of leakage by an increased diameter of the discharging-cone, as this cone may be arranged to slide in a bearing formed in the casing A.

That part of the casing A in which slides.

the discharging-cone may be also made of such increased thickness as to adapt it to receive a combining-cone of very small diameter and do good work, though I prefer the construction shown.

Of course I am aware that it is n new to construct injectors so that the internal parts or a portion thereof may be removed bodily without disconnecting the injector-casing from its several connections, and I do not desire to claim this, broadly. I believe, however, that it is new to combine said internal parts, or a portion thereof, with an internal casing adapted for removal from the injector in the manner set forth.

Having now particularly described my said invention, what I claim as new is—

1. The combination, with the steam-cone, the lifting-cone, the overflow branch or chamber, and the communicating passage between said lifting-cone and overflow-branch, of a combining and discharging cone controlled by the force of the jet of steam, or by that of the combined jet of steam and water, to automatically open and close said passage, substantially as and for the purposes hereinbefore set forth.

2. In an injector, the combination, with a lifting-cone, C′, of a combining and discharging cone controlled by the force of the jet of steam, or by that of the combined jet of steam and water, to automatically vary the area of the space intervening between said lifting and combining cones, or close said passage, as described, for the purpose specified.

3. In an injector, the combination, with a lifting-cone, C′, an overflow branch or chamber, and a communicating passage between said cone and overflow-branch, of combining and discharging cones having overflow-ports interposed between their axial passages, said cones being actuated by the force of the jet of steam, or by that of the combined jet of steam and water, to automatically control said passage, as described, for the purpose specified.

4. In an injector, the combination, with a steam-cone and a lifting-cone, C′, of combining and discharging cones controlled by the force of the jet of steam, or that of the combined jet of steam and water, to automatically vary the area of the space intervening between the combining-cone and the lifting and steam cones, as described, for the purpose specified.

5. In an injector, the combination, with a steam-cone and a lifting-cone, C′, of combining and discharging cones having overflow-ports interposed between their axial passages, said cones being controlled by the force of the jet of steam, or by that of the combined jet of steam and water, to automatically vary the area of the space intervening between the combining-cone and the lifting and steam cones, or close the passage between the combining and lifting cones, as described, for the purpose specified.

6. In an injector, the combination, with the injector-casing, of an internal casing provided with bearings for a lifting-cone, and a combining and a discharging cone, said internal casing being adapted for endwise removal from the injector-casing, for the purpose stated.

7. In an injector, the combination, with the injector-casing having steam and water overflow, and delivery branches, of an internal casing constituting the bearings for the lifting, combining, and discharging cones, and adapted for removal from the casing with said cones without uncoupling the injector from either of its connected branches, as described.

8. The combination, substantially as herein described, with the casing A, its steam and water overflow and delivery passages, and the steam-cone C, of the casing D, screwed at one end into casing A, the lifting-cone C′, secured to one end of casing D, and the combining and discharging cones $C^2$ $C^3$, having overflow-ports $p^2$, between their axial passages, said cones $C^2$ $C^3$ being arranged to slide longitudinally within the casing D, said parts co-operating to the ends stated.

In testimony whereof I have hereunto set my hand this 26th day of January, A.D. 1886.

JAMES GRESHAM.

Witnesses:
PETER J. LIVSEY,
JAMES WOOD.